US006882912B2

(12) United States Patent
DiLodovico et al.

(10) Patent No.: US 6,882,912 B2
(45) Date of Patent: Apr. 19, 2005

(54) REAL TIME STAMPING SYNCHRONIZATION SYSTEM

(75) Inventors: Steven Thomas DiLodovico, Allen Park, MI (US); Igor Krivochenitser, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 10/063,092

(22) Filed: Mar. 19, 2002

(65) Prior Publication Data

US 2003/0182035 A1 Sep. 25, 2003

(51) Int. Cl.[7] .................................................. G06F 19/00
(52) U.S. Cl. .......................................... 701/35; 701/301
(58) Field of Search ............................ 701/301, 29, 35, 701/45, 36, 117, 207, 213, 223; 340/905, 924, 438; 370/312, 321, 324, 330, 336, 337

(56) References Cited

U.S. PATENT DOCUMENTS

| | | | | |
|---|---|---|---|---|
| 4,258,421 A | | 3/1981 | Juhasz et al. | |
| 4,638,289 A | | 1/1987 | Zottnik | |
| 4,817,118 A | | 3/1989 | Wilburn et al. | |
| 4,853,859 A | | 8/1989 | Morita et al. | |
| 4,866,616 A | | 9/1989 | Takeuchi et al. | |
| 4,992,943 A | | 2/1991 | McCracken | |
| 5,068,654 A | * | 11/1991 | Husher | 455/502 |
| 5,430,432 A | | 7/1995 | Camhi et al. | |
| 5,446,659 A | | 8/1995 | Yamawaki | |
| 5,526,357 A | * | 6/1996 | Jandrell | 370/346 |
| 5,581,464 A | | 12/1996 | Woll et al. | |
| 5,625,556 A | * | 4/1997 | Janky et al. | 701/1 |
| 5,638,273 A | | 6/1997 | Coiner et al. | |
| 5,802,545 A | | 9/1998 | Coverdill | |
| 5,815,093 A | | 9/1998 | Kikinis | |
| 5,941,915 A | | 8/1999 | Federle et al. | |
| 6,076,026 A | | 6/2000 | Jambhekar et al. | |
| 6,166,698 A | * | 12/2000 | Turnbull et al. | 343/713 |
| 6,185,490 B1 | | 2/2001 | Ferguson | |
| 6,195,605 B1 | | 2/2001 | Tabler et al. | |
| 6,405,132 B1 | * | 6/2002 | Breed et al. | 701/301 |
| 6,466,849 B1 | * | 10/2002 | Kamiji et al. | 701/45 |
| 6,490,515 B1 | * | 12/2002 | Okamura et al. | 701/49 |
| 2002/0198632 A1 | * | 12/2002 | Breed et al. | 701/1 |
| 2003/0009270 A1 | * | 1/2003 | Breed | 701/29 |

* cited by examiner

*Primary Examiner*—Thomas G. Black
*Assistant Examiner*—Ronnie Mancho
(74) *Attorney, Agent, or Firm*—Frank A. MacKenzie

(57) ABSTRACT

A real time stamp synchronization system (14) for an automotive vehicle (12) is provided. The system (14) includes a vehicle clock (52) that stores a current time. A time receiver (50) receives a real time signal from a time center (16). A collision system controller (54) is electrically coupled to the vehicle clock (52) and the time receiver (50) and synchronizes the current time with the real time signal. A collision evaluation system (10) for reconstructing a collision event is also provided along with methods for performing the same stated systems.

22 Claims, 2 Drawing Sheets

REAL TIME STAMPING SYNCHRONIZATION SYSTEM

BACKGROUND OF INVENTION

1. Technical Field

The present invention relates generally to collision evaluation systems, and more particularly to a method and apparatus for real time stamping synchronization of automotive vehicle-related systems.

2. Background of the Invention

Currently, post collision evaluation is performed to reconstruct a collision event and provide a better understanding of actual occurrences during the collision event. Reconstruction of collision events requires an abundance of data corresponding to both on-vehicle systems and off-vehicle systems. The data may include vehicle velocities, vehicle direction of travel, vehicle component statuses and faults, restraint information, approximate weather conditions, and various other related information.

The data collected may be stored on the vehicle during the collision event or information such as weather or traffic signal information may be collected off the vehicle via information centers. On-vehicle systems such as a restraints control module store collision related information relative to other collision related information. For example, a computer generated clock time is recorded when an accelerometer senses a potentially collidable object and a time of deployment is recorded relative to the generated clock time as to when a restraint was activated relative to the detection of the object. None of these events, however, are recorded relative to the actual time of day.

Synchronization of fault times for various on vehicle system components provides information that can be used to determine which failures on the vehicle occurred first. Determining which failures occurred first, aids in determining what faults may have caused other faults. Also, by understanding what faults occurred first, degradation of vehicle systems functionality at relative times during the collision may be evaluated.

Since, element times corresponding to various occurrences during a collision event are stored relative to each other it is difficult to determine and correlate what actual weather conditions existed, what actual traffic signals existed, and what other related conditions or signals existed at a particular time during a collision event. It is also difficult to correlate stored times on a first vehicle with stored times on a second vehicle. Another difficulty is in being able to ascertain whether an electronic device such as a pager, cell phone, computer, personal digital assistant, or other electronic device is operative during a collision event.

An ongoing concern for safety engineers is to provide a safer automotive vehicle with increased collision avoidance and injury prevention capability. Improved vehicle safety designs can be realized if additional and better collision information could be retrieved from a vehicle relating to reconstruction of elements of a collision.

Therefore, it would be desirable to provide an improved collision evaluation system for an automotive vehicle that provides for greater ease in correlation of element times for both on-vehicle and off-vehicle systems. In so doing, a reduction in the frequency of collisions and the severity of collisions maybe realized.

SUMMARY OF INVENTION

The present invention provides improved methods and apparatuses for real time stamping synchronization of automotive vehicle related systems. In an embodiment, a real time stamp synchronization system for an automotive vehicle is provided. The system includes a vehicle clock that stores a current time. A time receiver receives a real time signal from a time center. A collision system controller is electrically coupled to the vehicle clock and the time receiver and synchronizes the current time with the real time signal.

In another embodiment, a collision evaluation system for reconstructing a collision event is also provided. A time center generates and transmits a real time signal. A vehicle having a real time stamp synchronization system receives the real time signal and synchronizes a vehicle clock to the real time signal. The real time stamp synchronization system generates a vehicle collision event signal corresponding to the collision event in real time. A collision evaluation center in communication with the vehicle stores the vehicle collision event signal. The collision evaluation center reconstructs the collision event in response to the vehicle collision event signal. Methods for performing the same stated systems are furthermore provided.

One of several advantages of the present invention is that it provides real time synchronization with various vehicle-related systems, therefore, providing ease in evaluating and reconstructing a collision event.

The present invention, in providing real time synchronization, also provides an accurate method of determining and comparing when collision event elements occurred in real time.

Another advantage of the present invention is that it allows determination of fault occurrences in real time and in relation with each other, as well as the ability to compare the fault times with other collision event elements.

Furthermore, the present invention also provides a system for automatic vehicle clock resetting and updating of vehicle-related system clock times, thereby maintaining accurate real time on a vehicle clock.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to a method and apparatus for real time stamping synchronization of automotive vehicle-related systems, the present invention may be adapted to be used in other systems that may require real time synchronization. The present invention may be used in conjunction with any of the following systems including: a forward collision warning system, a collision avoidance system, a vehicle system, a personal electronic system, or other various related systems.

In the following description, various operating parameters and components are described for one constructed embodiment. These specific parameters and components are included as examples and are not meant to be limiting.

Also, in the following description the terms "vehicle-related system" includes both on-board and off-board vehicle systems and components. On-board vehicle-related systems include electrical or mechanical systems on a vehicle, such as a restraints control module or a brake system. Off-board vehicle-related systems include personal electronic systems, such as a computer, a personal data assistant, a pager, or a cell phone. Off-board vehicle-related systems may also include weather stations, traffic control stations, or collision evaluation centers, among others.

Additionally, in the following description the term "performing" may include activating, deploying, initiating, powering, and other terms known in the art that may describe the manner in which a passive countermeasure may be operated.

As well, in the following description the term "countermeasure" may refer to an object or may be referring to an action. For example, a countermeasure may be performed or a countermeasure may be activated. An airbag is a countermeasure. A controller may perform a countermeasure by signaling an airbag to deploy.

Moreover, in the following description a collision event element may be any action performed, any fault, any indication, any status update, any time signal, any weather condition, any traffic condition, or any other element that may be considered in reconstructing a collision event.

Figure 1:
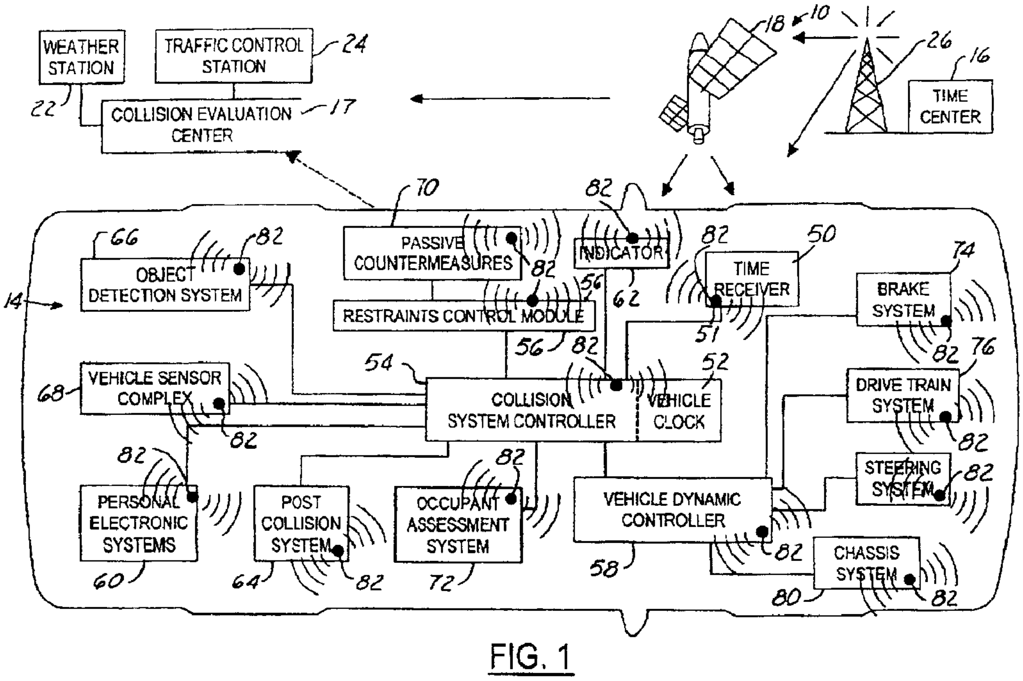
FIG. 1 is a block diagram of a collision evaluation system for reconstructing a collision event having an automotive vehicle utilizing a real time stamp synchronization system in accordance with an embodiment of the present invention.

Referring now to FIG. 1, a block diagram of a collision evaluation system 10 for reconstructing a collision event having an automotive vehicle 12 utilizing a real time stamp synchronization system 14 in accordance with an embodiment of the present invention is shown. The evaluation system 10 includes a time center 16, the synchronization system 14, a collision evaluation center 17 as well as other collision event related systems, centers, and stations. The time center 16 continuously generates and transmits a real time signal. The real time signal may be received directly by the synchronization system 14 or may be directed to a satellite 18 and retransmitted to the synchronization system 14.

The synchronization system 14 stores and utilizes the real time signal for day-to-day activities and during collision events. After a collision event occurs, vehicle collision related information in the form of a vehicle collision event signal is communicated to a collision evaluation center 17. The collision evaluation center 17 stores the vehicle collision event signal, and in combination, may also store a weather signal and a traffic control signal from a weather station 22 and a traffic control station 24, respectively. The weather signal and the traffic control signal correspond in real time to the vehicle collision event signal. The stored signals may then be evaluated as to modify a vehicle-related system.

An example of a time center 16, that may be used, is the National Institute of Standards (NIST). The NIST transmits radio signals containing the real time signal throughout the United States. The NIST provides an updated and accurate real time signal containing a current real time, which is used as a standard for time reporting services. The real time signal may be directly transmitted via a tower 26 to the vehicle 12 or may be transmitted to satellite 18 and then retransmitted to the vehicle 12.

The synchronization system 14 includes a time receiver 50, a vehicle clock 52, and a collision system controller 54, as well as other vehicle systems. The real time signal is received by the time receiver 50, which is than transmitted to the controller 54. The controller 54 synchronizes the real time signal with stored time on the vehicle clock 52, as well as possibly on other vehicle-related systems including a restraints control module 56, a vehicle dynamic controller 58, and personal electronic systems 60. Synchronization may occur continuously or periodically, such as once a day or once an hour. The controller 54 indicates vehicle time related information to a vehicle operator via an indicator 62. The vehicle time related information may include information such the current real time, when maintenance is due on a vehicle system, or other vehicle time related information. The synchronization system 14 may also include a post collision system 64 as to inform vehicle occupants and others, such as emergency services, of vehicle and occupant statuses and collision event information in real time.

The time receiver 50 includes a transceiver 51, such that it is capable of receiving the real time signal and wirelessly transmitting the real time signal to the controller 54.

The vehicle clock 52 may be a stand-alone system or may be a portion of a vehicle-related system, such as a vehicle radio (not shown), or as part of the controller 54, as shown. The vehicle clock 52 is a clocking system. A clocking system may be an oscillator, a counter, or any electrical, mechanical, or software based timing device known in the art.

The controller 54 as well as the restraint control module 56 and the vehicle dynamic controller 58, are preferably microprocessor based such as a computer having a central processing unit, memory (RAM and/or ROM), and associated input and output buses. The controller 54, the restraint control module 56, and the vehicle dynamic controller 58 may be a portion of a central vehicle main control unit or may be stand-alone controllers.

Controller 54 receives an object detection signal and a vehicle sensor complex signal from an object detection system 66 and a vehicle sensor complex 68, respectively. Controller 54 upon receiving the object detection signal determines the potential for a collision between the vehicle 12 and an object. The controller 54 assesses the environment and current situation that the vehicle 12 is encountering. Controller 54, in response to the environment and a current situation, determines whether any countermeasures should be performed. The controller 54 in response to the object detection signal and the vehicle sensor complex signal determines whether to perform a passive countermeasure 70, perform an active countermeasure, or not to perform a countermeasure. When performing a passive countermeasure 70 or an active countermeasure the controller 54 generates a countermeasure signal, which is transmitted to the restraints control module 56 and the vehicle dynamics controller 58. Before, during, and after performing a passive countermeasure 70 or active countermeasure the controller 54 stores real times corresponding to when each action occurs. The stored real time is used in reconstruction of a collision event. The controller 54 may also use occupant assessment information including occupant positions, occupant sizes, and occupant weights via an occupant assessment system 72 in determining what passive countermeasures 70 or active countermeasures to perform. The occupant assessment information may also be stored in relation to real time in the controller 54. The controller 54 may also store real time data corresponding to sensor data obtained by the object detection system 66 or the vehicle sensor complex 68.

The controller 54 may receive countermeasure status signals containing status information corresponding to a countermeasure device. The controller 54 in receiving a countermeasure status signal, in combination with the object detection signal, determines to perform a countermeasure as a function of the countermeasure status signal and the object detection signal.

The object detection system 66 may be as simple as a single motion sensor or a single accelerometer, or may be as complex as a combination of multiple motion sensors, accelerometers, cameras, and transponders. The object detection system 66 may contain any of the above mentioned sensors and others such as radar, lidar, ultrasonic, active infrared, passive infrared, telematic, or other sensors known in the art.

The vehicle sensor complex 68 is a conglomerate of various vehicle system sensors including: a brake position sensor, a throttle position sensor, an inertial sensor, a steering sensor, a suspension sensor, a tire pressure sensor, a vehicle inertial sensor, a wheel speed sensor, a vehicle speed sensor, a yaw rate sensor, an occupant position sensor, a seat belt sensor, an occupant classification sensor, accelerometers, a pedal sensor, a seat track sensor, a steering column sensor, or other vehicle sensors. The above sensors may be used individually, separately, or in conjunction with each other in generating the vehicle sensor complex signal.

The restraints control module 56 upon receiving the countermeasure signal may activate one or a combination of passive countermeasures 70. The passive countermeasures 70 may include internal air bag control, seatbelt control, knee bolster control, head restraint control, load limiting pedal control, load limiting steering control, pretensioner control, external air bag control, pedestrian protection control, and other passive countermeasures known in the art.

The vehicle dynamics controller 58 in response to the countermeasure signal signals either a braking system 74, a engine management system 76, a steering system 78, a chassis system 80, or a combination thereof to adjust the traveling velocity, heading direction, or orientation of the vehicle. In adjusting the orientation of the vehicle 12 the vehicle dynamics controller 58 signals the chassis system 80 to raise or lower portions of the vehicle 12. The vehicle dynamics controller 58 may operate the vehicle 12 by signaling one of the above stated systems as to avoid a collision.

The indicator 62 indicates vehicle time related information and warning information. The vehicle time related information such as when an oil change is due is in relation to real time. So for example, when the vehicle 12 has a predetermined maintenance schedule that is in relation to real time the controller 54 may signal the indicator 62 to inform the vehicle operator of maintenance that is due. The warning information is in response to the countermeasure signal, warning the vehicle operator of a potential collision so that the vehicle operator may actively perform a precautionary action to avoid a collision. The indicator 62 may include a video system, an audio system, an LED, a light, global positioning system, a heads-up display, a headlight, a taillight, a display system, a telematic system or other indicator.

Post collision system 64 may include prognostics and telematics and generate post collision signals as well as provide prognostics of vehicle 12 and occupant statuses and collision event information in real time. Emergency centers may be signaled such as hospitals, police stations, fire stations, or other emergency centers. The prognostics may offer occupant status including occupant heart rate, occupant breathing information, occupant positioning, or other occupant information. The telematics, using modern verbal communication systems allows a vehicle occupant to communicate to one of the above-mentioned emergency centers. Vehicle status information and the collision event elements may also be communicated using the telematics. The occupant and vehicle related information may be communicated such that each collision event element has a corresponding real time associated with it.

Personal electronic systems 60 may include a computer, a pager, a cell phone, a personal digital assistant, or other personal electronic device. The personal electronic devices may be in communication with the controller 54 via a wire-based system such as a docking station or cable adapter, or via a wireless system as described below or through an infrared or other telematic port. The personal electronic systems are synchronized to the real time signal through the controller 54.

The synchronization system 14 may be wire-based or wireless in which case each vehicle related-system may have a transceiver 82 or be part of a communication network so as to transmit and receive signals containing countermeasure and status related information. The following are examples of a transceiver and two wireless networks that may be used a Bluetooth antenna, a local area networks (LAN) 802.11 system, or a LAN 802.11b system. Of course, other similar transceivers or networks known in the art may be utilized.

The collision evaluation center 17 stores all collision event related signals and information including the vehicle collision event signal, the weather signal, the traffic control signal, and other related signals and information. The information may be evaluated and used in modification of existing vehicle-related systems or in the design of future vehicle-related systems. The modification of a vehicle-related system may be for the purpose of increase safety of a vehicle, safety of a vehicle traffic area, or other various vehicle-related system improvements. The collision evaluation center 17 may be a center that systems such as the Fatality Analysis Reporting System (FARS), the National Automotive Sampling Systems (NASSs), or may simply be a manufacturer storage facility.

The weather station 22 may be any weather reporting center or weather center that stores weather—related information corresponding to real time. The weather station 22 may store weather information such as temperatures, barometric pressures, atmospheric conditions, or other weather-related information in synchronization with the real time signal from the time center 16 or other source.

The traffic control station 24 stores traffic information including timing of traffic lights, traffic conditions, traffic signals, construction locations, or other traffic control related information also synchronized to the real time signal from the time center 16 or other source.

Figure 2:
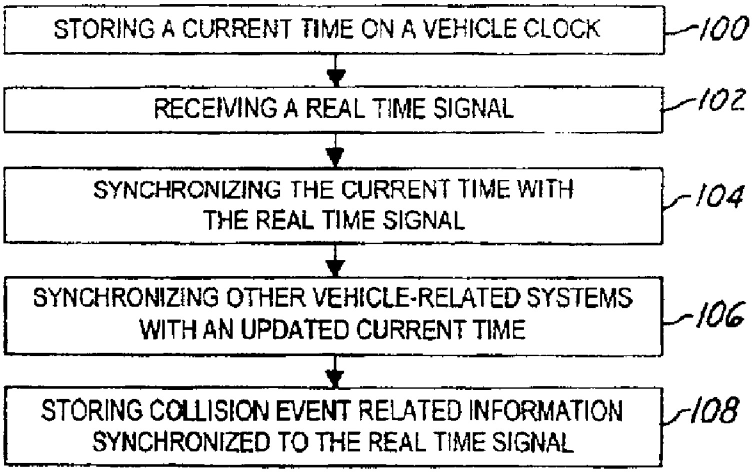
FIG. 2 is a logic flow diagram illustrating a method of real time stamping synchronization of automotive vehicle related systems for an automotive vehicle in accordance with an embodiment of the present invention.

Referring now to FIG. 2, a logic flow diagram illustrating a method of real time stamping synchronization of automotive vehicle-related systems for the automotive vehicle 12 in accordance with an embodiment of the present invention is shown.

In step 100, the vehicle clock stores a current time. The current time is used throughout the vehicle 12 in determining when vehicle functions or actions occur relative to each other. For example, the controller stores a first time when an object is detected followed by storing a second time corresponding to when a passive countermeasure is activated. The first time and the second time correspond to a current time on the vehicle clock as to when they were performed.

In step 102, the time receiver 50 continuously or periodically receives the real time signal from the time center 16. The time receiver 50 then transmits the real time signal to the controller 54.

In step 104, upon receiving the real time signal the controller 54 synchronizes the current time with the real time signal. The current time over time may drift, or because of a power loss, may be erased and therefore not storing the correct time. In order to maintain a correct real time on the vehicle clock 52, the controller 54 resets and synchronizes the current time with the real time signal, thereby, providing accurate up to date real time before, during, and after a collision event.

In step 106, upon synchronizing the current time with the real time signal the controller 54 may synchronize time stored on other vehicle-related systems that also have a clocking system other than the vehicle clock 52 to the updated current time. In so doing, it allows other devices such as the personal electronic systems 60 to have automatic real time updates.

In step 108, the controller 54 stores collision event related information, synchronized to the real time signal, as collision event elements are performed or occur. The stored collision event related information corresponding to real time may then be later used in reconstruction of a collision event.

Figure 3:
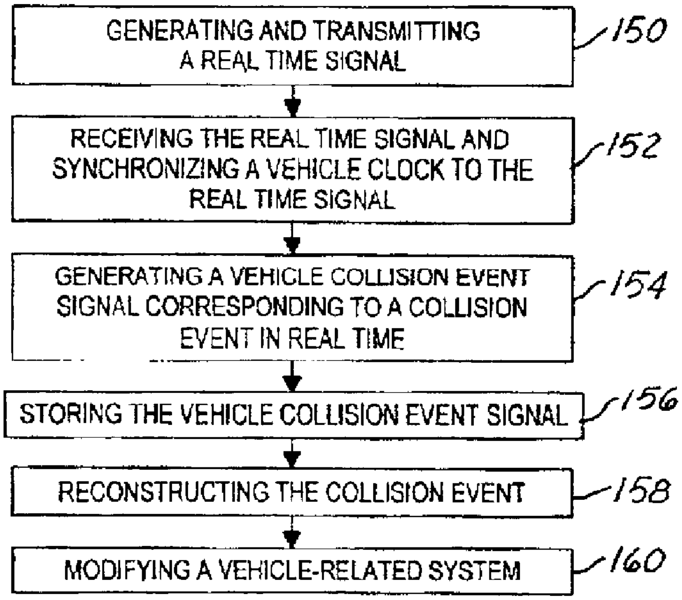
FIG. 3 is a logic flow diagram illustrating a method of reconstructing a collision event in accordance with an embodiment of the present invention.

Referring now to FIG. 3, a logic flow diagram illustrating a method of reconstructing a collision event in accordance with an embodiment of the present invention is shown.

In step 150, the time center 16 generates and transmits the real time signal, as stated above.

In step 152, the synchronization system 14 receives the real time signal and synchronizes the vehicle clock 52 to the real time signal.

In step 154, the controller 54 generates a vehicle collision event signal corresponding to the collision event in real time. The collision event signal is transmitted to the collision evaluation center 17 via a wire-based or wireless-based system known in the art.

In step 156, the collision evaluation center 17 stores the vehicle collision event signal along with the weather signal, the traffic control signal, and other collision event related signals in a local or national database.

In step 158, the collision event is reconstructed in response to one or more of the collision event related signals. All of the stored vehicle-related information for the collision event is evaluated in relation to real time to determine the sequence of collision event elements as they occurred.

In step 160, upon reconstructing the collision event designers and engineers may evaluate the collision event related signals and determine to modify a vehicle-related system. Multiple collision events having similar characteristics may be reviewed and compared.

The present invention provides precise real time synchronization of multiple vehicle-related systems and a method for comparing collision event elements in real time. The ability to compare collision event elements in real time provides improved collision information, in turn, providing an improved method for reconstructing a collision event. The present invention also provides real time synchronization of personal electronic systems and an improved method for indicating to a vehicle operator of when vehicle maintenance is due in relation to real time.

The above-described apparatus, to one skilled in the art, is capable of being adapted for use in other systems that may require real time synchronization. The above-described invention may also be varied without deviating from the spirit and scope of the invention as contemplated by the following claims.

What is claimed is:

1. A real time stamp synchronization system for an automotive vehicle comprising:

a vehicle clock storing a current time;

a time receiver receiving a real time signal;

an object detection system generating a non-inertial based object detection signal in response to at least one object in proximity with the vehicle; and a collision system controller electrically coupled to said vehicle clock, said time receiver, and said object detection system, said collision controller synchronizing said current time with said real time signal and storing said non-inertial based object detection signal in synchronization with said real time signal.

2. A system as in claim 1 wherein said collision system controller synchronizes said real time signal with a time stored on a clocking system other than said vehicle clock.

3. A system as in claim 1 wherein said collision system controller stores collision event related information synchronized to said real time signal.

4. A system as in claim 1 further comprising a vehicle sensor complex generating a vehicle sensor complex signal, said collision system controller electrically coupled to said vehicle sensor complex and storing said vehicle sensor complex signal in synchronization with said real time signal.

5. A system as in claim 1 further comprising restraints control module generating a restraints control signal, said collision system controller electrically coupled to said restraints control module and storing said restraints control signal in synchronization with said real time signal.

6. A system as in claim 1 further comprising a vehicle dynamic controller generating a vehicle dynamic signal said collision system controller electrically coupled to said vehicle dynamic controller and storing said vehicle dynamic signal in synchronization with said real time signal.

7. A system as in claim 1 further comprising an occupant assessment system generating an occupant assessment signal, said collision system controller electrically coupled to said occupant assessment system and storing said occupant assessment signal in synchronization with said real time signal.

8. A system as in claim 1 further comprising a telematics system electrically coupled to said collision system controller, said telematics system generating and transmitting a vehicle and occupant assessment signal in synchronization with said real time signal.

9. A system as in claim 1 further comprising a personal electronic system electrically coupled to said collision system controller, said personal electronic system synchronizing a personal electronic system clock with said real time signal.

10. A system as in claim 9 wherein said personal electronic system is electrically coupled to said collision system controller by a communication transport or port.

11. A system as in claim 1 wherein said collision system controller is in wireless communication with one or more vehicle related systems.

12. A system as in claim 1 further comprising an indicator indicating vehicle maintenance information in relation to said real time signal.

13. A collision evaluation system for reconstructing a vehicle collision event comprising:

a real time stamp synchronization system, said real time stamp synchronization system receiving a real time signal from a time center and synchronizing a vehicle clock to said real time signal, said real time stamp synchronization system generating a vehicle collision event signal corresponding to the collision event in real time;

said real time stamp synchronization system comprising;

an object detection system generating a non-inertial based object detection signal in response to at least one object in proximity with the vehicle; and a collision system controller electrically coupled to said object detection system and storing said non-inertial based object detection signal in synchronization with said real time signal; and a collision evaluation center in communication with said vehicle, said collision evaluation center storing said vehicle collision event signal and said object detection signal, said collision evaluation center reconstructing said collision event in response to said vehicle collision event signal and said non-inertial based object detection signal.

14. A system as in claim 13 wherein said time center includes a satellite.

15. A system as in claim 13 wherein said time center includes a weather station.

16. A system as in claim 13 wherein said time center includes a traffic control station.

17. A method of real time stamping synchronization of automotive vehicle related systems for an automotive vehicle comprising:

storing a current time on a vehicle clock;

receiving a real time signal;

synchronizing said current time with said real time signal;

generating a non-inertial based object detection signal after detection of and in response to at least one object in proximity with the vehicle via an object detection system;

performing vehicle tasks after detection of said at least one object; and storing said non-inertial based object detection signal and performance times of said vehicle tasks in synchronization with said real time signal.

18. A method as in claim 17 further comprising synchronizing said real time signal with time stored on a clocking system other than said vehicle clock.

19. A method as in claim 18 further comprising storing collision event related information synchronized to said real time signal.

20. A method of reconstructing a collision event comprising:

generating and transmitting a real time signal;

receiving said real time signal and synchronizing a vehicle clock to said real time signal;

generating a non-inertial based object detection signal via an object detection system in response to at least one object in proximity with a vehicle of concern;

storing said a non-inertial based object detection signal in synchronization with said real time signal;

generating a vehicle collision event signal corresponding to the collision event in real time;

storing said vehicle collision event signal; and reconstructing the collision event in response to said vehicle collision event signal and said object detection signal.

21. A method as in claim 20 further comprising modifying a vehicle related system in response to said stored vehicle collision event signal.

22. A method as in claim 21 wherein said vehicle related system comprises a personal electronic device.

* * * * *